UNITED STATES PATENT OFFICE.

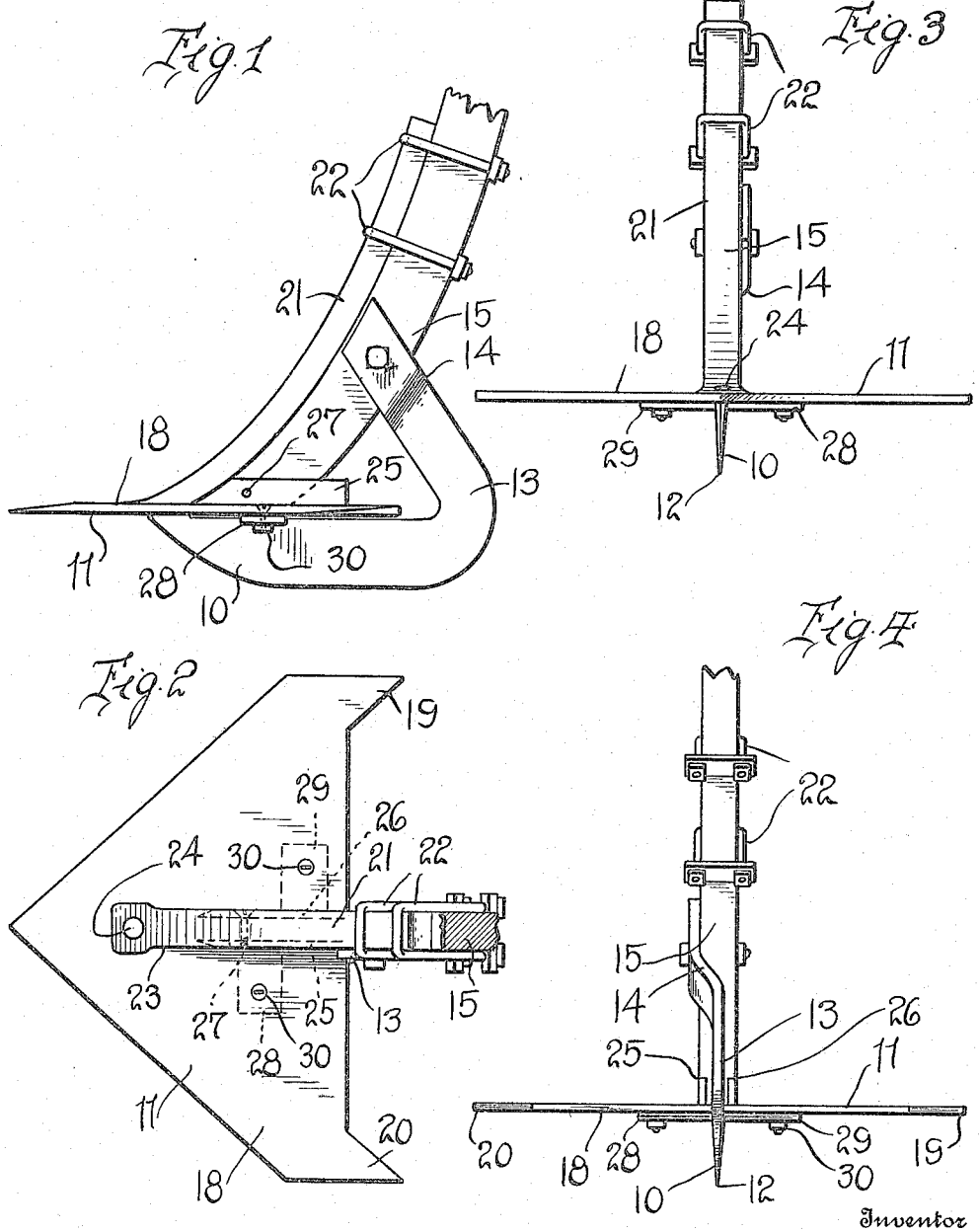

ROY B. HEDGES, OF LA JUNTA, COLORADO.

AGRICULTURAL IMPLEMENT.

1,143,907.　　　　　Specification of Letters Patent.　　Patented June 22, 1915.

Application filed March 1, 1915. Serial No. 11,296.

*To all whom it may concern:*

Be it known that I, ROY B. HEDGES, a citizen of the United States, residing at La Junta, in the county of Otero and State of Colorado, have invented certain new and useful Improvements in Agricultural Implements, of which the following is a specification, reference being had to the accompanying drawings.

The present invention relates broadly to new and useful improvements in agricultural implements of the plow type and has particular reference to the provision of a surface soil plow in which the cutting blade or share is so disposed that it will be particularly effective in cutting roots of alfalfa, cow peas or any other similar plants below the crown of the root.

The principal object of the invention is to provide an alfalfa crowner which consists essentially in a vertical and a horizontal share or cutter blade, the horizontal member acting to sever at the roots of the plant and the vertical member serving as a keel or guide for preserving the line of draft of the horizontal cutter.

An object of equal importance with the foregoing is to so construct the two blades that they may be easily and quickly attached to any standard form of plow, upon the removal of the share from the standard thereof.

The above and additional objects are accomplished by such means as are illustrated in the accompanying drawings, described in the following specification, and then more particularly pointed out in the claims which are appended hereto and form a part of this application.

With reference to the drawings, wherein there has been illustrated the preferred embodiment of this invention, as it is reduced to practice, and throughout the several views of which similar reference numerals designate corresponding parts, Figure 1 is a side elevation showing the cutters secured to a conventional form of plow standard. Fig. 2 is a top plan view. Fig. 3 is a front elevation. Fig. 4 is a rear elevation.

As previously stated, the invention consists essentially in a vertical cutting blade 10 and a horizontal cutting blade 11. The member 10 is provided with a sharp lower edge 12 which is curved upwardly, in the manner of a sleigh runner, at each end. From the rear terminal of the vertical guide 10, there extends upwardly and in the direction of the vertical center line of the knife, an attaching arm 13, the upper end of which is offset as indicated at 14, so that it may be engaged against one face of the plow standard illustrated conventionally at 15, allowing the blade 10 to lie in the central longitudinal plane of the plow beam. The horizontal blade designated by the numerals 11 and 18, is preferably shaped as an isosceles triangle being provided, however, at its rear corner with the pointed extensions 19 and 20. This horizontal blade is interposed between the vertical knife 10 and the lower end of the plow standard. In securing the blade 18 to the plow standard, I employ the attaching shank 21. This shank is longitudinally curved to conform to the curvature of the forward face of the plow standard and is secured flatly thereagainst by means of U bolts 22 or equivalent fastening devices. The lower end of the shank passes through an opening 23 formed in the blade 18 and is flattened so that it may be secured by rivets 24 against the lower face of the blade in the manner best disclosed in Fig. 1.

As will be noted upon reference to Fig. 1, the lower end of the plow beam rests in the angle formed by the blade 10 and the attaching shank 21. As a further means for securing the member 18 rigidly to the lower end of the plow beam, there is provided a pair of parallel, spaced lugs or attaching ears 25 and 26, which are formed integrally with the blade and are designed to engage against the lower end of the plow beam at the lower terminal thereof. A bolt indicated at 27 is passed through these members 25 and 26 and through the plow standard.

As a means for holding the vertical blade 10 against transverse movement, there is provided a pair of horizontally disposed lugs or plates 28 and 29 which are formed integrally with the member 10 and extend laterally from the upper edge thereof. These members 28 and 29 engage flatly against the lower face of the horizontal blade 18 and are secured thereto by bolts, rivets or any other equivalent fastening devices, indicated at 30.

From the foregoing description it now becomes apparent that I have provided an agricultural implement which will be efficacious in cutting the roots of alfalfa, cow peas or any other similar plants. The horizontal blade, being sharpened along its diverging forward edges, will readily cut through the surface and sever the roots of the plants below the crown thereof. A straight line of draft will be insured for the horizontal blade 18 in view of the location of the vertical blade 10. As will be apparent, this member 10 acts in service as a keel for the horizontal blade 18.

In the use of the instrument, the horizontal cutter blade severs the roots of the plants below the crown thereof, leaving the roots in the soil so that they may later be removed by a harrow or similar implement.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined by the appended claims.

What is claimed is:—

1. An agricultural implement including a supporting standard, a horizontal blade, a vertical blade detachably secured to the horizontal blade and extending from the lower face thereof, and independent means for detachably securing both the horizontal and vertical blades to the standard.

2. An agricultural implement including a supporting standard, a horizontal blade of triangular shape, a vertically disposed blade, means rigidly connecting the horizontal and vertical blades, and means detachably securing both of said blades to the supporting standard.

3. An agricultural implement including a supporting standard, a horizontal blade, an attaching shank rising from the horizontal blade and engageable against the supporting standard, means detachably securing the shank against the supporting standard, a vertically disposed blade arranged below the horizontal blade, and an attaching arm for detachably securing the vertical blade to the supporting standard.

4. An agricultural implement including a supporting standard, a horizontal blade, an attaching shank rising from the horizontal blade and engageable against the supporting standard, means detachably securing the shank against the supporting standard, a vertically disposed blade arranged below the horizontal blade, an attaching arm for detachably securing the vertical blade to the supporting standard, and horizontally arranged attaching plates carried by the vertical blade and rigidly secured to the horizontal blade for maintaining the two blades in fixed relation to each other.

5. An agricultural implement including a supporting standard, a horizontal blade, a shank extending upwardly from the blade and engaging against the supporting standard, spaced attaching lugs rising from the blade and engaging against opposite faces of the supporting standard, a vertical blade disposed beneath the horizontal blade, laterally extending plates carried by the vertical blade, means rigidly securing the plates to the horizontal blade for maintaining the vertical and horizontal blades in fixed relation to each other, and an upwardly extending attaching arm carried by the vertical blade, said vertical blade being disposed in the longitudinal center line of the supporting standard, said attaching arm being detachably secured to the supporting standard.

6. An agricultural implement including a supporting standard, a horizontal blade, a shank rising from the blade and engaging against the supporting standard, spaced attaching lugs rising from the blade and engaging against opposite faces of the supporting standard, and a vertical blade adjustably secured to the lower face of the horizontal blade.

7. An agricultural implement including a supporting standard, a horizontal blade, a shank rising from the blade and engaging against the supporting standard, a vertical blade, laterally extending plates carried by the blade, fastening means rigidly and detachably securing the plates to the lower face of the horizontal blade, and a vertically extending attaching arm carried by the vertical blade for engagement against the standard.

In testimony whereof I hereunto affix my signature in the presence of two witnesses.

ROY B. HEDGES.

Witnesses:
 CLYDE T. DAVIS,
 CHAS. E. SELIEN.

Copies of this patent may be obtained for five cents each, by addressing the "Commissioner of Patents, Washington, D. C."